United States Patent
Bontu

(10) Patent No.: US 7,418,212 B1
(45) Date of Patent: *Aug. 26, 2008

(54) ELECTRICAL DETECTION OF OPTICAL SYMBOLS

(75) Inventor: Chandra Bontu, Nepean (CA)

(73) Assignee: Nortel Networks Limited, St. Laurent, Quebec (CA)

(*) Notice: Subject to any disclaimer, the term of this patent is extended or adjusted under 35 U.S.C. 154(b) by 700 days.

This patent is subject to a terminal disclaimer.

(21) Appl. No.: 10/674,530

(22) Filed: Oct. 1, 2003

(51) Int. Cl.
*H04B 10/06* (2006.01)

(52) U.S. Cl. .................. 398/202; 398/208; 398/209; 398/210; 398/211; 398/213; 398/214; 398/140; 398/141; 398/147; 398/149; 398/158; 398/159; 398/154; 398/155; 398/164; 398/25; 398/26; 398/27; 398/29; 398/30; 398/31; 398/32; 398/33; 398/36; 375/316; 375/317; 375/232; 375/233; 375/348; 375/349

(58) Field of Classification Search .......... 398/202, 398/208, 149, 159, 158, 209, 141, 147, 182, 398/183, 192, 193, 194, 210, 211, 140, 213, 398/214, 154, 155, 164, 25, 26, 27, 29, 30, 398/31, 32, 33, 36; 375/232, 233, 317, 340, 375/348–350, 316

See application file for complete search history.

(56) References Cited

U.S. PATENT DOCUMENTS

| | | | | | |
|---|---|---|---|---|---|
| 5,191,462 | A | * | 3/1993 | Gitlin et al. | 398/209 |
| 6,775,631 | B2 | * | 8/2004 | Van Schyndel | 702/85 |
| 7,031,405 | B1 | * | 4/2006 | Touzni et al. | 375/326 |
| 7,110,683 | B2 | * | 9/2006 | Bessios | 398/208 |
| 7,110,923 | B2 | * | 9/2006 | Riess et al. | 703/2 |
| 2003/0063663 | A1 | * | 4/2003 | Bryant | 375/229 |
| 2005/0105919 | A1 | * | 5/2005 | Sugihara et al. | 398/202 |

OTHER PUBLICATIONS

Design of near optimum electrical equalizers for optical transmission in the presence of PMD; H.F. Haunstein, K. Sticht; A. Dittrich, W. Sauer-Greff, R. Urbansky, Optical Society of America, 2000.

* cited by examiner

*Primary Examiner*—Hanh Phan
(74) *Attorney, Agent, or Firm*—Jeffrey M. Measures; Borden Ladner Gervais LLP

(57) ABSTRACT

A system and method for detecting digital symbols carried in a received optical signal. The system comprises a functional element operative to receive a stream of samples of an electrical signal derived from the received optical signal and to evaluate a non-linear function of each received sample, thereby to produce a stream of processed samples. The system also comprises a detector operative to render decisions about individual symbols present in the received optical signal on the basis of the stream of processed samples. In an embodiment, the non-linear function computes substantially the square root of each received sample.

33 Claims, 4 Drawing Sheets

| SYMBOL PATTERN | THRESHOLD |
|---|---|
| 0 0 0 0 0 | $F_0$ |
| 0 0 0 0 1 | $F_1$ |
| 0 0 0 1 0 | $F_2$ |
| 0 0 0 1 1 | $F_3$ |
| 0 0 1 0 0 | $F_4$ |
| ⋮ | ⋮ |
| 1 1 1 1 1 | $F_{2^N-1}$ |

L2 — L1
$K^{TH}$ BIT POSITION
N

FIG. 4

ELECTRICAL DETECTION OF OPTICAL SYMBOLS

FIELD OF THE INVENTION

The present invention pertains to electrical detection of symbols carried in an optical signal and, more particularly, to electrical detection of symbols having undergone inter-symbol interference during optical transmission.

BACKGROUND OF THE INVENTION

In optical transmission systems, optical pulses travelling along a transmission medium are affected by dispersion, which causes individual pulses to be distorted by neighbouring pulses in time, a phenomenon known as inter-symbol interference (ISI). Consequently, decisions about a transmitted pulse, which are based upon the received but distorted version of that pulse, will be inaccurate, leading to a high bit error rate (BER).

In order to combat inter-symbol interference in optical signals, various techniques have been proposed. For example, a purely optical solution provides for a dispersion compensation fiber (DCF) at intervals of several kilometers along the transmission path. A DCF is a specially doped fiber which re-aligns the pulses travelling therealong in time. However, DCFs are not only expensive but also ineffective for long-haul and dense wavelength-division multiplexed (DWDM) systems.

Other proposed techniques have borrowed from the field of electrical signal equalization. These include linear tapped delay structures which are directly applied to the electrical version of the received optical signal following opto-electronic conversion. While such techniques may improve system performance, they tend to do so only to a limited extent since they can only compensate for linear components of the ISI. Conventional approaches fail to take into account that the opto-electronic conversion process in the receiver leads to non-linearities in the ISI and also to non-Gaussianity of the noise statistics, neither of which can be compensated for successfully through the use of a conventional equalizer.

Thus, there is a need in the industry to provide an improved system and method for detecting received optical symbols, especially in the presence of inter-symbol interference.

SUMMARY OF THE INVENTION

According to a first broad aspect, the invention seeks to provide a system for detecting digital symbols carried in a received optical signal. The system comprises a functional element operative to receive a stream of samples of an electrical signal derived from the received optical signal and to evaluate a non-linear function of each received sample, thereby to produce a stream of processed samples. The system also comprises a detector operative to render decisions about individual symbols present in the received optical signal on the basis of the stream of processed samples.

In a specific embodiment, the non-linear function is substantially the square root.

In a specific embodiment, the detector is operative to render decisions about individual symbols present in the received optical signal on the basis of a computed similarity between corresponding ones of the processed samples and each of a plurality of thresholds associated with possible transmitted symbol patterns In a specific embodiment, each of the thresholds is associated with a respective one of the possible transmitted symbol patterns. For each particular one of the processed samples, the detector determines which possible transmitted symbol pattern has an associated threshold to which the particular processed sample is most similar and renders a decision about an individual symbol present in the received optical signal on the basis of the previously determined symbol pattern.

In accordance with a second broad aspect, the present invention seeks to provide a method of detecting digital symbols carried in a received optical signal. The method comprises receiving a stream of samples of an electrical signal derived from the received optical signal; evaluating a non-linear function of each received sample, thereby to produce a stream of processed samples; and rendering decisions about individual symbols present in the received optical signal on the basis of the stream of processed samples.

According to a third broad aspect, the present invention seeks to provide a method of training a symbol detector. The method comprises transmitting an optical training signal along a channel, the transmitted optical training signal carrying a sequence of symbols arranged in transmitted symbol patterns. The method also comprises receiving the optical training signal and evaluating a non-linear function of samples of a received electrical training signal derived from the received optical training signal, thereby to produce processed samples of the received electrical training signal. For each processed sample of the received electrical training signal, the method comprises identifying the transmitted symbol pattern within which said processed sample occupies a predetermined bit position; and storing a feature of said processed sample as an indication of the identified symbol pattern.

According to a fourth broad aspect, the present invention seeks to provide a computer-readable storage medium containing a program element for execution by a computing device to implement a symbol detection system for detecting digital symbols carried in a received optical signal, where the symbol detection system comprises a functional element operative to receive a stream of samples of an electrical signal derived from the received optical signal and to evaluate a non-linear function of each received sample, thereby to produce a stream of processed samples. The system also comprises a detector operative to render decisions about individual symbols present in the received optical signal on the basis of the stream of processed samples.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIG. 4 shows the contents of a memory accessed by the symbol detector in the received of FIG. 1.

DETAILED DESCRIPTION

Figure 1:
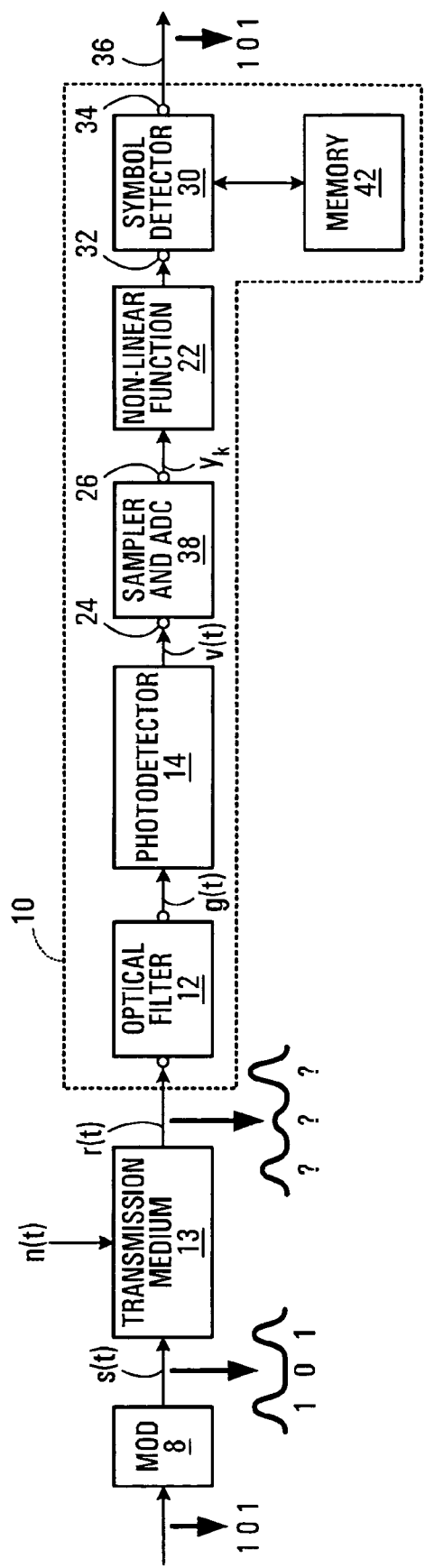
FIG. 1 is a block diagram of a receiver in accordance with an embodiment of the present invention, comprising a non-linear function block and a symbol detector.

In a specific scenario to which the present invention is applicable, a sequence of bits (digital symbols) of interest $\{a_j\}$ are converted by a modulator (MOD) 8 into binary intensity-modulated optical pulses that make up a transmitted optical signal s(t). It is to be understood that non-binary-valued pulses are also within the scope of the present invention when each symbol conveys more than one bit of information. The pulses in the transmitted optical signal s(t) occupy symbol intervals of duration $T_S$ seconds. As depicted in FIG. 1, the transmitted optical signal s(t) travels along a transmission medium 13 where distortion occurs in the form of, e.g., inter-symbol interference (ISI) and additive noise. Upon arrival at the receiver 10, the received optical signal r(t) contains distorted optical pulses. Mathematically, r(t) can be represented as the sum of c(t) and η(t), where c(t) contains the result of inter-symbol interference and η(t) is additive noise.

The inter-symbol interference (ISI) may have both causal and non-causal components. With respect to a given reference pulse, the causal component may arise due to a delay of previously transmitted pulses, while the non-causal component may arise due to after-arising pulses travelling faster than the reference pulse. It is assumed that the most significant causal components of the ISI extend for L1 symbol intervals and that the most significant non-causal components of the ISI extend for L2 symbol intervals. Hence, a symbol in the received optical signal r(t) will be affected by L1 previous pulses and L2 pulses that have yet to arrive. L1 and L2 are dependent on the length and type of fiber, as well as on the distance that the pulses traveled through the transmission medium 13. L1 and L2 may vary greatly, and improved performance can be achieved for a wide range of L1 and L2, even if L1 or L2 are zero. No significant difference to the structure or operation of the present invention will arise from a different assumption regarding L1 or L2.

In order to detect (i.e., estimate) the information bits $\{a_j\}$ that are encoded in the transmitted optical signal s(t), on the basis of the received optical signal r(t), the receiver 10 is equipped with an optical filter 12, a photodetector 14, a sampler and analog-to-digital converter (SADC) 38, non-linear function block 22 and a symbol detector 30.

The optical filter 12 is useful for eliminating unwanted carriers from the received optical signal r(t), in order to avoid cross-channel interference upon photodetection. In an example embodiment, the optical filter 12 may take the form of a frequency-domain brick-wall filter with bandwidth $M/T_S$ for a chosen value of M; of course, various other filters can be used without departing from the spirit of the present invention. For example, any optical bandpass filter with noise equivalent bandwidht of $M/T_S$ would be suitable. The output of the optical filter 12 is denoted g(t).

The photodetector 14 may be implemented in any conventional manner, such as a PIN diode, for example. The photodetector 14 functions to receive at an input port the optical signal g(t), to convert this signal into an electrical signal v(t), and to provide the electrical signal v(t) at an output port. Typically, the electrical signal v(t) output by the photodetector 14 has a current proportional to the power of the received optical signal r(t) (or, equivalently, g(t)).

The SADC 38 is connected to the output port 18 of the photodetector 14. Its function is to sample the electrical signal v(t) at a rate of greater than or equal to $1/T_S$ (where $T_S$ is the symbol interval) and to produce output samples, denoted $y_k$, at a rate of $1/T_S$. To this end, the SADC 38 may contain an integrate-and-dump filter, or any other suitable low-pass filter, which takes M samples of the electrical signal v(t) every $T_S$ samples and integrates these to produce one sample of $y_k$. The samples $y_k$ produced in this manner are hereinafter referred to as electrical signal samples and are supplied to the non-linear function block 22. The SADC 38 may also contain additional filtering stages (e.g., an anti-alias filter).

The non-linear function block 22, which in this embodiment is digital but may otherwise be analog, has an input port 24 and an output port 26. The non-linear function block 22 receives at its input port 24 the electrical signal samples $y_k$. The main objective of the non-linear function block 22 is to change the noise statistics of the electrical signal samples $y_k$ in order to optimize the detection performance while minimizing the receiver complexity.

As will now be shown, one way of achieving this is for the non-linear function block 22 to substantially approximate a square root function, i.e., the samples at the output port 26 of the non-linear function block 22 have a magnitude proportional to substantially the square root of the magnitude of the electrical signal samples $y_k$ at the input port 24. Those skilled in the art will find it within their capabilities to design a function block having this type of behaviour. The following mathematical treatment is offered to justify the desire to approximate a square root function.

Firstly, at the transmit side, it is assumed that the information bits $\{a_j\}$ are passed through a pulse shaping filter with impulse response p(t), resulting in the waveform of the transmitted optical signal s(t):

$$s(t) = \sum_j a_j p(t - jT_s) \quad \text{Eq. (1)}$$

where $T_S$ is the symbol period. The waveform s(t) travels along a channel which includes electrical-to-optical conversion, chromatic dispersion, polarization mode dispersion (PMD) and other non-linear distortion effects resulting from fiber propagation along the transmission medium 13. This results in a received optical signal, r(t), which can be represented as the sum of a channel output waveform c(t) and optical noise η(t):

$$r(t) = c(t) + \eta(t), \quad \text{Eq. (2)}$$

where η(t) is assumed for mathematical convenience to be additive white Gaussian noise (AWGN). The received optical signal r(t) can be further expressed as follows to include first order PMD effects:

$$r(t) = e^{j\phi}[r^s(t) + r^f(t)], \quad \text{Eq. (3)}$$

where $r^s(t)$ and $r^f(t)$ represent the slow and fast components, respectively, due to first-order PMD, and where φ represents the carrier phase. In the following analysis, the carrier phase φ is assumed to vary slowly compared to the symbol period, $T_S$, and thus can be treated as constant over a block of $N_B$ symbols. In each case (slow or fast), one has:

$$r^{s,f}(t) = \alpha^{s,f} \left\{ \sum_{k=0}^{N_B} X_k^{s,f}(t) + \eta^{s,f}(t) \right\}, \quad \text{Eq. (4)}$$

where $$X_k^{s,f}(t) = f^{s,f}(A_k;t) \text{ for } kT_S \leq t \leq (k+1)T_S \text{ and}$$

$$A_k = \{a_{k-L1}, a_{k-L1+1}, \ldots, a_k, a_{k+1}, \ldots, a_{k+L2}\}. \quad \text{Eq. (5)}$$

Also, note that the ISI (both linear and non-linear) is assumed to be limited to L1 pre-cursor symbols and L2 post-cursor symbols. The subscripts s,f correspond to slow and fast components, respectively. The function $f(\ldots)$ represents the chromatic dispersion and non-linear distortion of the fiber, while $\alpha$ is a constant to represent the polarization dependent loss (PDL). Furthermore, note that $\eta^s(t)$ and $\eta^f(t)$ are uncorrelated identically distributed additive white Gaussian noise (AWGN) random variables with single sided power spectral density $\sigma_n^2$ (since they are zero mean Gaussian random variables, they are also independent and identically distributed).

Now, the sampled output of the photodetector 14 at time $kT_s$ can be expressed as follows:

$$v_k = r_k^s(r_k^s)^* + r_k^f(r_k^f)^*. \quad \text{Eq. (6)}$$

Assuming for simplicity that $\alpha^s = \alpha^f = 1$, it can be shown that the conditional probability density function (PDF) of $v_k$ is a Chi-square distribution with four degrees of freedom given by the following equation:

$$p(v_k | A_k) = \frac{1}{2\sigma_n^2}\left(\frac{\sqrt{v_k}}{R_k}\right) e^{\frac{(R_k^2+v_k)}{2\sigma_n^2}} I_1\left(\sqrt{v_k}\frac{R_k}{\sigma_n^2}\right) \quad v_k \geq 0 \quad \text{Eq. (7)}$$

where $I_m(\ldots)$ is the $m^{th}$ order modified Bessel function of the first kind and where:

$$R_k^2(A_k) = |X_k^s|^2 + |X_k^f|^2. \quad \text{Eq. (8)}$$

Note that $R_k$ is a function of $A_k$, the transmitted bit pattern. For simplicity, the dependency on $A_k$ is not explicitly indicated in the following analysis, but the dependency is reinstated whenever appropriate. Also, in the following analysis, the optical filter 12 is assumed to be a frequency domain brick-wall filter with bandwidth $M/T_S$. Therefore, the impulse response of such filter has M zeros every $T_S$ seconds. Let it also be assumed for the time being that the SADC 38 is simply an integrate and dump filter (IDF), the output of which over one symbol period can be expressed as a sum of M statistically independent samples of $v_k$:

$$y_k = \sum_{i=0}^{M-1} v_k(i) \quad \text{Eq. (9)}$$

where $$v_k(i) = v\left(kT + \frac{i}{M}T\right). $$

It can be shown that the probability density function (PDF) of $y_k$ is Chi-square with 4M degrees of freedom, given as follows:

$$p(y_k | A_k) = \frac{1}{2\sigma_n^2}\left(\frac{y_k}{F_k^2}\right)^{\frac{2M-1}{2}} e^{\frac{(F_k^2+y_k)}{2\sigma_n^2}} I_{2M-1}\left(\sqrt{y_k}\frac{F_k}{\sigma_n^2}\right), \quad \text{Eq. (10)}$$

where $$F_k^2(A_k) = \sum_{j=0}^{M-1} R_k^2(j), \quad \text{Eq. (11A)}$$

$$R_k(i) = v\left(kT + \frac{i}{M}T\right) \text{ and} \quad \text{Eq. (11B)}$$

$$R_k^2(A_k) = |X_k^s|^2 + |X_k^f|^2. \quad \text{Eq. (11C)}$$

Referring to Eq. (11A) above, $F_k(A_k)$ will hereinafter be denoted simply $F_k$. The conditional likelihood metric for optimum detection of sequence $A_k$ is obtained from Eq. (10), above (for more information on a optimum detection, the reader is referred to J. G. Proakis, *Digital Communications*, Third Edition, McGraw-Hill, New York, 1995):

$$\ln[p(y_k | A_k)] = -\ln(2\sigma_n^2) + \frac{(2M-1)}{2}\ln\left(\frac{y_k}{F_k^2}\right) - \frac{(F_k^2+y_k)}{2\sigma_n^2} + \ln\left[I_{2M-1}\left(\sqrt{y_k}\frac{F_k}{\sigma_n^2}\right)\right] \quad \text{Eq. (12)}$$

Thus, in the absence of the non-linear function block 22, Eq. (12) above represents the likelihood metric that would need to be evaluated by the symbol detector 30 in order to determine the true maximum a posteriori probability of transmitting a given bit sequence, given the observation of an electrical signal sample $y_k$. However, the implementation of the above equation, each time a sample $y_k$ and for each of the values $F_k$, tends to be computationally complex and thus it would be advantageous to simplify the design of the symbol detector 30.

Accordingly, certain simplifications can be made to Eq. (12) above which allow the symbol detector 30 to perform relatively simple computations and yet to render decisions almost as optimal as those of a true MAP detector. Specifically, the following mathematical treatment shows how a symbol detector 30 as simple as a threshold detector can be used to achieve quasi-optimal detection.

Firstly, $I_{2M-1}(x)$ is monotonic, and for large x, can be approximated by $$\frac{e^x}{\sqrt{2\pi x}}.$$

Using this approximation, the likelihood metric can be simplified as follows:

$$\ln[p(y_k | A_k)] \cong -\ln(2\sigma_n^2) + \frac{(2M-1)}{2}\ln\left(\frac{y_k}{F_k^2}\right) - \frac{(F_k^2 + y_k)}{2\sigma_n^2} + \sqrt{y_k}\frac{F_k}{\sigma_n^2} - \frac{1}{2}\ln\left(\sqrt{y_k}\frac{F_k}{\sigma_n^2}\right).$$  Eq. (12')

Rearranging the terms in the above equation and neglecting all the constant terms, one obtains:

Eq. (13)

$$\ln[p(y_k | A_k)] \cong \frac{1}{2}\ln\left(\left(\frac{y_k}{F_k^2}\right)^{2M-1} \Big/ \sqrt{y_k}\frac{F_k}{\sigma_n^2}\right) - \frac{(\sqrt{y_k} - F_k)^2}{2\sigma_n^2}.$$

For small M (recalling that $M/T_S$ is the bandwidth of the optical filter 12), the last term dominates the first term in the above likelihood metric. Therefore first term can be neglected, resulting in the following sub-optimal likelihood metric:

$$\ln[p(y_k | A_k)] \cong -\frac{(\sqrt{y_k} - F_k)^2}{2\sigma_n^2}.$$  Eq. (14)

Therefore, one possible sub-optimum detection rule is to calculate the metric $(\sqrt{y_k}-F_k)^2$ for all the possible bit patterns and the one with the smallest such metric is selected as the most likely estimate of the transmitted bit pattern $A_k$. This sub-optimum metric is relatively easy to implement in a practical system compared to the metric given in Eq. (12). Specifically, all this requires is for the non-linear function block 22 to be designed to exhibit a square root function and for the symbol detector 30 to be implemented as a threshold detector, which greatly simplifies the overall design of the receiver 10. Referring to the simplification made just prior to the introduction of Eq. (7), it can also be shown that Eq. (14) is also the sub-optimum detection metric when $\alpha^{s\neq}\alpha^{f\neq}1$. The supporting computations are considered to be a matter of routine for one of ordinary skill in the art and are thus omitted here.

Thus, it will be seen that this version of the symbol detector 30 is adapted to determine a degree of similarity between the square root of the voltage level of the current electrical signal sample $y_k$ and each of a the values $F_k$ stored in a memory 42 (e.g., a random access memory—RAM). The values $F_k$ are defined in Eq. (11A) and hereinafter referred to as "thresholds". The thresholds $F_k$ are dependent on the properties of the transmission medium 13. They can be pre-computed analytically or obtained during a training mode of operation (which will be described in greater detail later on). The symbol detector 30 proceeds to identify the threshold $F_k$ having the greatest degree of similarity with $\sqrt{y_k}$, which leads to a decision on the symbol represented by that sample.

A specific example of operation of the symbol detector 30 as a threshold detector is now described in greater detail with reference to the flowchart of FIG. 2. At step 220, the symbol detector 30 computes a degree of similarity between $\sqrt{y_k}$ and each of a set of thresholds $F_k$. The degree of similarity may be expressed in terms of the difference or the Euclidean distance, for example.

Each particular threshold $F_k$ stored in the memory 42 is associated with a distinct bit pattern, which may be stored in the memory 42 in association with the particular threshold $F_k$ or may be implicit in the address of the particular threshold $F_k$. When no ISI is being compensated for, then the number of possible bit patterns (and thresholds) is two, corresponding to "0" and "1". In general, however, each bit pattern includes N bits, where N=L2+1+L1 and where it is recalled that L1 represents the number of symbols making up the causal component of the ISI and L2 represents the number of symbols making up the non-causal component of the ISI. Furthermore, the total number of bit patterns is $2^N$ and each bit pattern is unique. In other words, although the current electrical signal sample represents either a "one" or a "zero", each of the $2^{L1}$ possible prior bit patterns and each of the $2^{L2}$ possible subsequent bit patterns may independently influences the feature determined at step 210. Hence, there are $2^{L1+L2}$ possible bit patterns when the current electrical signal sample is a "zero" and another $2^{L1+L2}$ possible bit patterns when the current electrical signal sample is a "one".

By way of convention, as illustrated in FIG. 1, the current electrical signal sample $y_k$ occupies the "$K^{th}$" bit position within a given bit pattern, where K is, equivalently, either L2+1 bit positions from the "left" or L1+1 bit positions from the "right" of the bit pattern in question.

Figure 2:
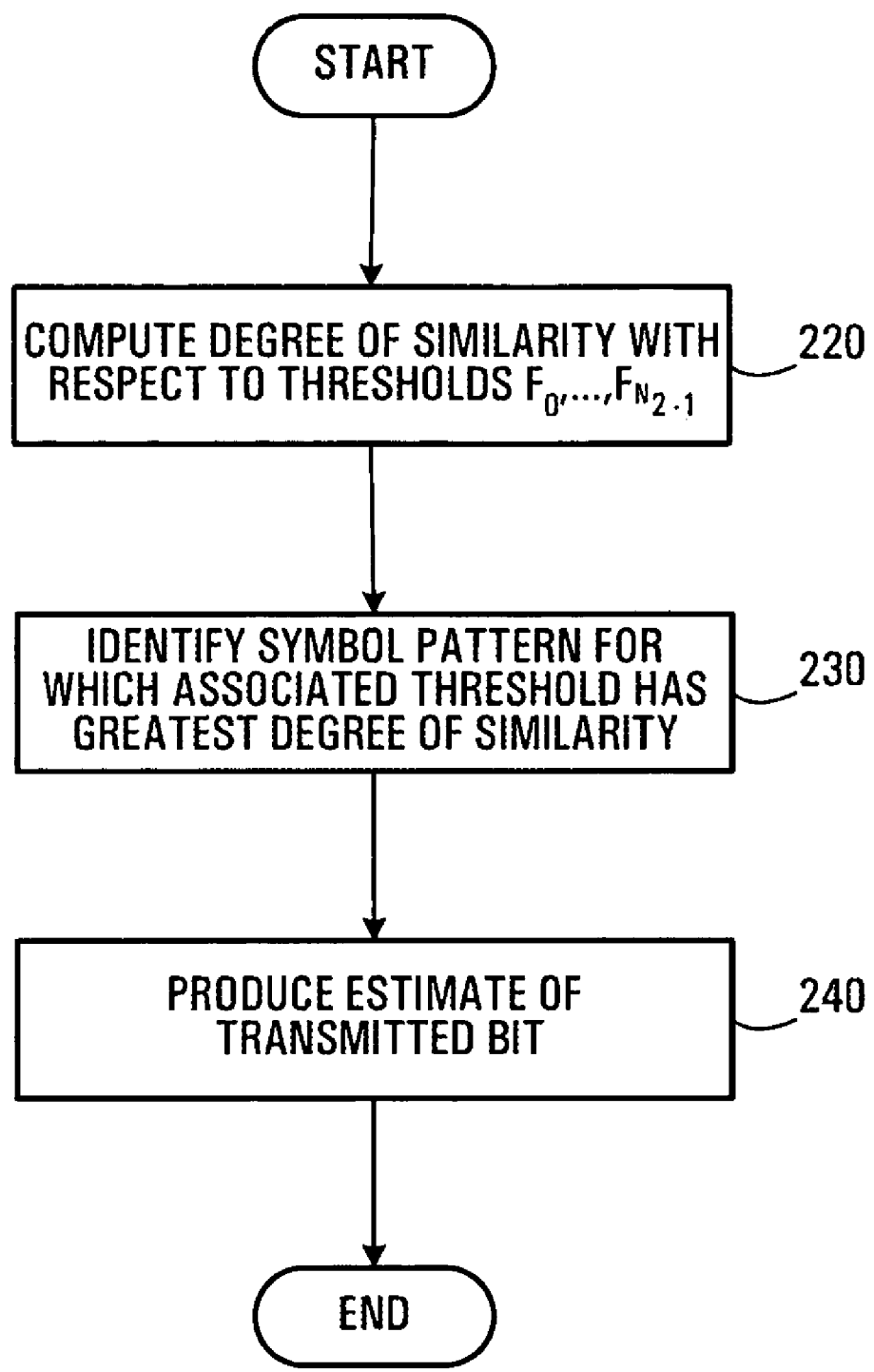
FIG. 2 is a flowchart illustrating operation of the symbol detector in the receiver of FIG. 1, in accordance with an embodiment of the present invention.

Returning now to the flowchart in FIG. 2, at step 230, the thresholds associated with the $2\times2^{L1+L2}(=2^{L1+L2+1})$ bit patterns are consulted to identify the bit pattern with which the associated threshold has the greatest degree of similarilty to $\sqrt{y_k}$. This could correspond to the threshold to which the Euclidean distance is minimum from $\sqrt{y_k}$. The bit pattern identified at step 230 can be said to be the bit pattern most closely associated with the current electrical signal sample $y_k$, which, under the various assumed stochastic conditions and because the non-linear function block 22 approximates a square root function, corresponds to the bit pattern having approximately the greatest likelihood of having been transmitted.

At step 240, the estimate of the transmitted bit is determined as being the bit value (either "one" or "zero") occupying the $K^{th}$ bit position of the bit pattern determined at step 230.

It is to be understood that many values for L1 and L2 are possible. For example, FIG. 4 shows a possible arrangement of the memory 42 accessed by the threshold detector 30, where L1=L2=2. Thus, N=5 and the bit position of the current electrical signal sample $y_k$ occupies the middle bit position (K=3). In another scenario, L2=0 would indicate absence of non-causal effects and makes the bit position of the current electrical signal sample $y_k$ equal to the first bit position (K=1). Alternatively, if L1=0, this indicates that only after-transmitted bits affect the current electrical signal sample and hence makes the bit position of the current electrical signal sample the last bit position (K=N=L2+1). In still other embodiments, both L1 and L2 are nonzero and differ from one another.

Figure 3:
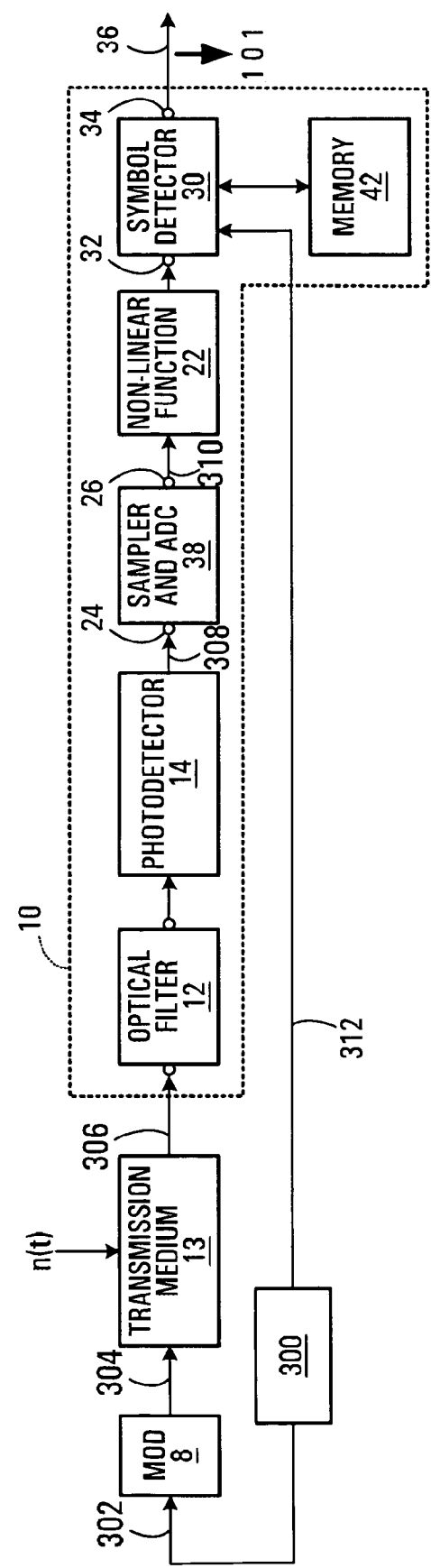
FIG. 3 shows the receiver of FIG. 1 in a training mode of operation.

The above has assumed that the thresholds $F_k$ are known. However, this is not always the case. In order to set the thresholds associated with the various bit patterns used by the symbol detector 30, the receiver 10 enters a training mode of operation. It should be appreciated that the mode of operation of the symbol detector 30, i.e., training or non-training, can be set in any known way, such as by an internal software flag or by a signal received from an external source. It will also be understood that the symbol detector 30 may autonomously enter into training mode on a periodic basis, e.g., by monitoring the headers of received packets or frames, which can be used as a source of known training sequences. In this way, the symbol detector 30 can be made to adapt to variations in the properties of the transmission medium 13. The training mode of operation is described with reference to FIG. 3, in which a training module 300 provides a known training sequence 302 to the modulator 8. The training sequence contains a sequence of symbols arranged in bit patterns. The bit patterns span the whole set of $2^N$ N-bit bit patterns, where it is recalled that N=L1+L2+1. It is observed that by using a pseudo-random noise (PN) sequence, a sequence of length ($2^N$+(N−1)) bits is sufficient to cover all $2^N$ N-bit bit patterns in a consecutively overlapping manner. For example, in the case where N=2, the length-5 sequence 00110 can be used for training purposes, since it covers the bit patterns 00, 01, 11 and 10 in a consecutively overlapping manner. In the case where N=3, the length-10 sequence 0011101000 can be used, since it covers the bit patterns 001, 011, 111, 110, 101, 101, 010, 100 and 000 in a consecutively overlapping manner. In general, longer sequences (for the same value N) are desirable for the training sequence 302, since they give multiple instances of the same bit pattern.

The training sequence 302 is converted by the modulator 8 into a stream of pulses of an optical training signal 304. The optical training signal 304 travels along the transmission medium 13 where the optical pulses in the optical training signal 304 are distorted, resulting in a received optical training signal 306. The received optical training signal 306 passes through the optical filter 12 and the photodetector 14, resulting in an electrical training signal 308. Subsequently, the electrical training signal 308 passes through the SADC 38, resulting in samples of the electrical training signal 310, produced at the inter-symbol interval of $T_S$ seconds. The non-linear function block 22 takes the square root of these samples 310 and provides the result to the symbol detector 30.

Each sample received by the symbol detector 30 will represent the $K^{th}$ bit position of a particular N-bit bit pattern. In training mode of operation, the identity of this bit pattern is known to the detector 30. Knowledge of the bit pattern can be obtained in various ways, e.g., based on knowledge of the training sequence 302 coupled with knowledge of the transit time through the transmission medium 13 and the various photodetection and filtering stages. For this purpose, a synchronization signal 312 can be provided by the training module 300 which generates the training sequence 302. In another embodiment, a cycle of known bit patterns can be predestined to occur following a pre-determined burst that is easily identifiable under a wide range of noise conditions. In either case, by determining the square root of the current electrical training signal sample 310, the symbol detector 30 is effectively computing the value of the threshold $F_k$ associated with the known bit pattern within which the currently received sample occupies the $K^{th}$ bit position.

In the case where the bit patterns in the training sequence 302 are overlapping, the next sample received at the symbol detector 30 will result in computation of the threshold for the next bit pattern, and so on, until a threshold has been computed for each of the possible bit patterns. Of course, when a bit pattern occurs more than once, then various schemes could be used to decide on the final threshold for that bit pattern, e.g., by computing an average threshold value. The thresholds associated with the various bit patterns are stored in the memory 42, which is then accessed by the symbol detector 30 during non-training mode in the manner previously described with reference to FIG. 2.

In other embodiments, it should be understood that the total number of thresholds $F_k$ may be $2^N-1$ rather than $2^N$, resulting in the definition of $2^N$ Voronoi regions, one corresponding to each of the $2^N$ bit patterns. Thus, in order to determine the bit pattern most closely associated with a particular received sample, the symbol detector 30 could be modified so as to identify the Voronoi region containing that sample.

It will also be understood that the symbol detector 30 may take on various other forms, examples of which include but are not limited to a linear tapped delay line equalizer, a fractionally spaced equalizer (FSE), a decision feedback equalizer (DFE), etc.

Moreover, the non-linear function block 22 can be made to compute a more elaborate function than the square root in order to account for situations where the simplifications made in Eq. (13) and Eq. (14) are not applicable.

Those skilled in the will further appreciate that the non-linear function block 22 may be integrated together with the symbol detector 30 and that either or both components may be implemented as an arithmetic and logic unit (ALU) having access to a code memory (not shown) which stored program instructions for the operation of the ALU. The program instructions could be stored on a medium which is fixed, tangible and readable directly by the processor, (e.g., removable diskette, CD-ROM, ROM, or fixed disk), or the program instructions could be stored remotely but transmittable to the non-linear function block 22/symbol detector 30 via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Those skilled in the art should also appreciate that the program instructions stored in the code memory can be compiled from a high level program written in a number of programming languages for use with many computer architectures or operating systems. For example, the high level program may be written in assembly language, while other versions may be written in a procedural programming language (e.g., "C") or an object oriented programming language (e.g., "C++" or "JAVA").

Those skilled in the art should further appreciate that in some embodiments of the invention, the functionality of the non-linear function block 22/symbol detector 30 may be implemented as pre-programmed hardware or firmware elements (e.g., application specific integrated circuits (ASICs), electrically erasable programmable read-only memories (EEPROMs), etc.), or other related components.

While specific embodiments of the present invention have been described and illustrated, it will be apparent to those skilled in the art that numerous modifications and variations can be made without departing from the scope of the invention as defined in the appended claims.

What is claimed is:

1. A system for detecting digital symbols carried in a received optical signal, comprising:
a functional element operative to receive a stream of samples sampled from an electrical signal derived from the received optical signal and to evaluate a non-linear function of each received sample, thereby to produce a stream of processed samples;

a detector operative to render decisions about individual symbols present in the received optical signal on the basis of the stream of processed samples;

wherein the non-linear function is substantially the square root.

2. The system defined in claim 1, wherein the detector being operative to render decisions about individual symbols present in the received optical signal comprises the detector being operative to render decisions about individual symbols present in the received optical signal on the basis of a computed similarity between corresponding ones of the processed samples and each of a plurality of thresholds associated with possible transmitted symbol patterns.

3. The system defined in claim 2, wherein each of the thresholds is associated with a respective one of the possible transmitted symbol patterns and wherein the detector being operative to render decisions about symbols present in the received optical signal comprises a program element for execution by a computing device to implement a method comprising the steps of, for each particular one of the processed samples:

a) determining which possible transmitted symbol pattern has an associated threshold to which the particular processed sample is most similar;

b) rendering a decision about an individual symbol present in the received optical signal on the basis of the symbol pattern determined at step a).

4. The system defined in claim 3, wherein the particular processed sample is more similar to a first one of the thresholds than to a second one of the thresholds when the absolute value of the difference between the particular processed sample and the first one of the thresholds is less than the absolute value of the difference between the particular processed sample and the second one of the thresholds.

5. The system defined in claim 4, wherein the number of symbol patterns in the plurality of possible transmitted symbol patterns is 2 to the power N for an integer N at least as large as one, and wherein each of the possible transmitted symbol patterns is a unique N-bit pattern.

6. The system defined in claim 4, wherein the number of symbol patterns in the plurality of possible transmitted symbol patterns is 2 to the power N for an integer N greater than one, and wherein each of the possible transmitted symbol patterns is a unique N-bit pattern.

7. The system defined in claim 6, wherein the method implemented by the program element for execution by the computing device comprises rendering a decision about an individual symbol present in the received optical signal comprises selecting, as the individual symbol present in the received optical signal, the bit value of a predetermined bit position within the N bits of the symbol pattern determined at step a).

8. The system defined in claim 7, wherein the method implemented by the program element for execution by the computing device comprises the predetermined bit position being located at an extremity of the symbol pattern determined at step a).

9. The system defined in claim 7, wherein the method implemented by the program element for execution by the computing device comprises the predetermined bit position being located between extremities of the symbol pattern determined at step a).

10. The system defined in claim 2, further comprising a photodetection unit operative to derive the electrical signal from the received optical signal.

11. The system defined in claim 10, wherein the electrical signal derived from the received optical signal has a current proportional to the power of the received optical signal.

12. The system defined in claim 10, wherein the electrical signal derived from the received optical signal has a voltage proportional to the power of the received optical signal.

13. The system defined in claim 10, wherein the photodetection unit comprises an optical filter operative to filter the received optical signal prior to deriving the electrical signal from the received optical signal.

14. The system defined in claim 10, further comprising:

a sampler operative to sample the electrical signal derived from the received optical signal, thereby to produce the samples of the electrical signal derived from the received optical signal.

15. The system defined in claim 14, further comprising an electrical filter operative to electrically filter the electrical signal derived from the received optical signal prior to sampling.

16. A method of detecting digital symbols carried in a received optical signal, comprising:

receiving a stream of samples sampled from an electrical signal derived from the received optical signal;

evaluating a non-linear function of each received sample, thereby to produce a stream of processed samples;

rendering decisions about individual symbols present in the received optical signal on the basis of the stream of processed samples;

wherein the non-linear function is substantially the square root.

17. The method defined in claim 16, wherein rendering decisions about individual symbols present in the received optical signal comprises rendering decisions about individual symbols present in the received optical signal on the basis of a computed similarity between corresponding ones of the processed samples and each of a plurality of thresholds associated with possible transmitted symbol patterns.

18. The method defined in claim 17, wherein each of the thresholds is associated with a respective one of the possible transmitted symbol patterns and wherein rendering decisions about symbols present in the received optical signal comprises, for each particular one of the processed samples:

a) determining which possible transmitted symbol pattern has an associated threshold to which the particular processed sample is most similar;

b) rendering a decision about an individual symbol present in the received optical signal on the basis of the symbol pattern determined at step a).

19. The method defined in claim 18, wherein the particular processed sample is more similar to a first one of the thresholds than to a second one of the thresholds when the absolute value of the difference between the particular processed sample and the first one of the thresholds is less than the absolute value of the difference between the particular processed sample and the second one of the thresholds.

20. The method defined in claim 19, wherein the number of symbol patterns in the plurality of possible transmitted symbol patterns is 2 to the power N for an integer N at least as large as one, and wherein each of the possible transmitted symbol patterns is a unique N-bit pattern.

21. The method defined in claim 19, wherein the number of symbol patterns in the plurality of possible transmitted symbol patterns is 2 to the power N for an integer N greater than one, and wherein each of the possible transmitted symbol patterns is a unique N-bit pattern.

22. The method defined in claim 21, wherein rendering a decision about an individual symbol present in the received optical signal comprises selecting, as the individual symbol present in the received optical signal, the bit value of a predetermined bit position within the N bits of the symbol pattern determined at step a).

23. The method defined in claim 22, wherein the predetermined bit position is located at an extremity of the symbol pattern determined at step a).

24. The method defined in claim 22, wherein the predetermined bit position is located between extremities of the symbol pattern determined at step a).

25. The method defined in claim 16, further comprising sampling the electrical signal derived from the received optical signal, thereby to produce the samples of the electrical signal derived from the received optical signal.

26. A method of training a symbol detector, comprising:
transmitting an optical training signal along a channel, the transmitted optical training signal carrying a sequence of symbols arranged in transmitted symbol patterns;
receiving the optical training signal;
evaluating a non-linear function of samples sampled from a received electrical training signal derived from the received optical training signal, thereby to produce processed samples of the received electrical training signal;
for each processed sample of the received electrical training signal:
a) identifying the transmitted symbol pattern within which said processed sample occupies a predetermined bit position;
b) storing a feature of said processed sample as an indication of the identified symbol pattern.

27. The method defined in claim 26, wherein evaluating a non-linear function comprises evaluating substantially the square root.

28. The method defined in claim 27, wherein the transmitted symbol patterns in the sequence of symbols carried in the optical training signal comprise 2 to the power N symbol patterns of N bits per symbol pattern, where N is an integer greater than one.

29. The method defined in claim 28, wherein successive transmitted symbol patterns in the sequence of symbols carried in the optical training signal are overlapping.

30. The method defined in claim 29, wherein the sequence of symbols carried in the optical training signal is a pseudo-random noise (PN) sequence.

31. The method defined in claim 30, wherein identifying comprises identifying the transmitted symbol pattern that was transmitted at a time in the past corresponding to the time it would take for a transmitted symbol to appear as a processed sample upon transmission.

32. The method defined in claim 31, wherein identifying comprises detecting a burst and identifying a transmitted symbol pattern known to occur after the burst.

33. The method defined in claim 28, wherein storing a feature of said processed sample as an indication of the identified symbol pattern comprises storing the value of the sample as a threshold associated with the identified symbol pattern.

* * * * *